(12) United States Patent
Egedal et al.

(10) Patent No.: US 11,959,458 B2
(45) Date of Patent: Apr. 16, 2024

(54) CORRECTING MEASURED WIND CHARACTERISTIC OF A WIND TURBINE

(71) Applicant: Siemens Gamesa Renewable Energy A/S, Brande (DK)

(72) Inventors: Per Egedal, Herning (DK); Thomas Esbensen, Herning (DK); Gustav Hoegh, Vejle (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 174 days.

(21) Appl. No.: 17/311,397

(22) PCT Filed: Oct. 31, 2019

(86) PCT No.: PCT/EP2019/079798
§ 371 (c)(1),
(2) Date: Jun. 7, 2021

(87) PCT Pub. No.: WO2020/120007
PCT Pub. Date: Jun. 18, 2020

(65) Prior Publication Data
US 2022/0025854 A1 Jan. 27, 2022

(30) Foreign Application Priority Data
Dec. 13, 2018 (EP) ..................... 18212393

(51) Int. Cl.
*F03D 7/02* (2006.01)
*F03D 1/06* (2006.01)
(52) U.S. Cl.
CPC ......... *F03D 7/0232* (2013.01); *F03D 1/0641* (2013.01); *F05B 2270/32* (2013.01);
(Continued)

(58) Field of Classification Search
CPC .................................................... F03D 7/0232
See application file for complete search history.

(56) References Cited

U.S. PATENT DOCUMENTS 6,320,272 B1    11/2001  Lading et al.
7,823,437 B2 *  11/2010  Siebers ................. G01P 21/025
                                                                  73/1.37
(Continued)

FOREIGN PATENT DOCUMENTS

CN    101016879 A    8/2007
CN    108291527 A    7/2018
(Continued)

OTHER PUBLICATIONS

International Search Report and Written Opinion of the International Searching Authority dated Feb. 11, 2020 for Application No. PCT/EP2019/079798.
(Continued)

*Primary Examiner* — Kayla Mccaffrey
(74) *Attorney, Agent, or Firm* — Schmeiser, Olsen & Watts, LLP

(57) ABSTRACT

Provided is a method of correcting a measurement value of least one wind characteristic, in particular wind speed and/or wind direction, related to a wind turbine having a rotor with plural rotor blades at least one having an adaptable flow regulating device installed, the method including: measuring a value of the wind characteristic; obtaining state information of the adaptable flow regulating device; and determining a corrected value of the wind characteristic based on the measured value of the wind characteristic and the state information of the adaptable flow regulating device.

19 Claims, 5 Drawing Sheets

Figure 1:
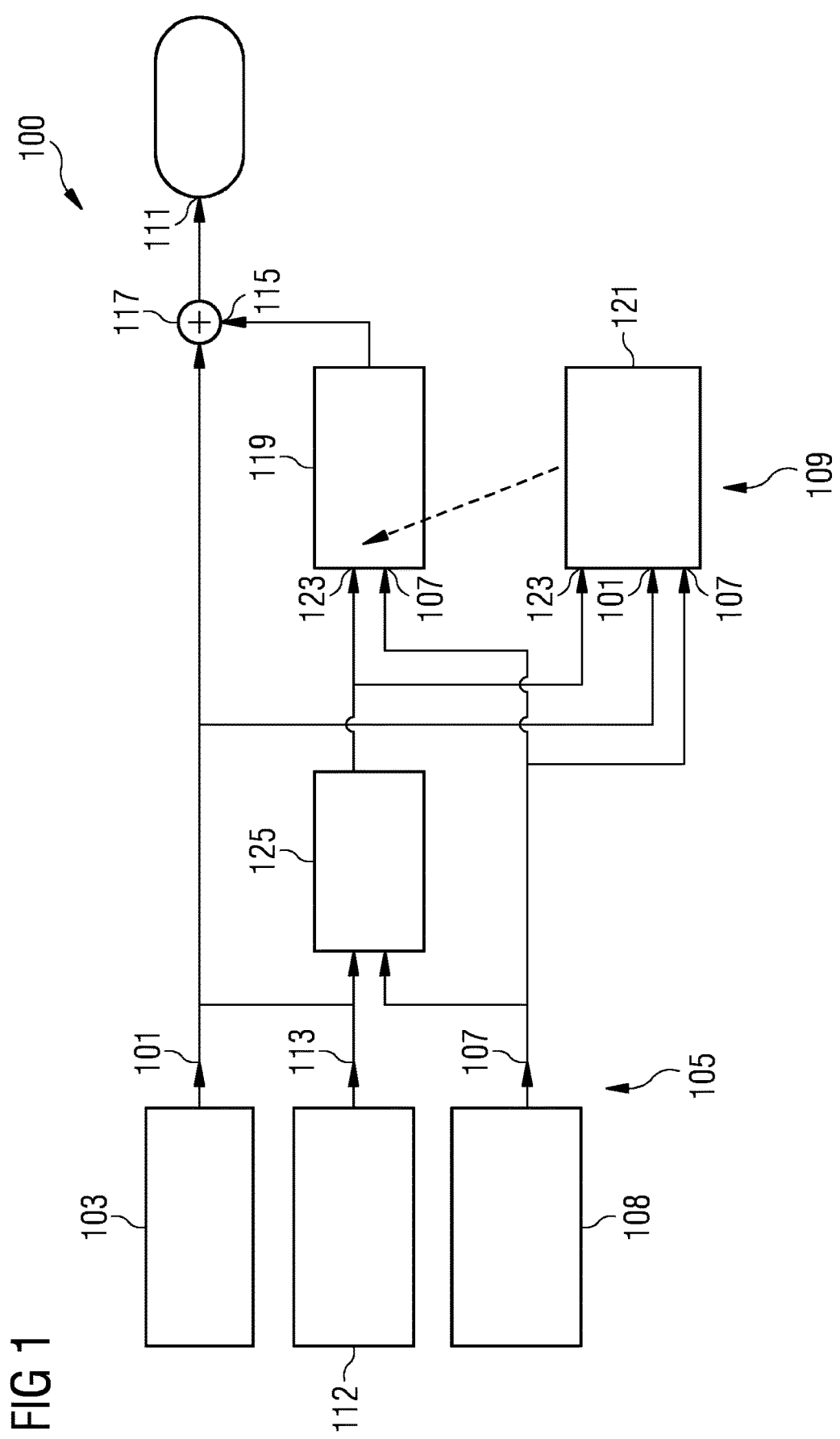

(52) U.S. Cl.
CPC ... *F05B 2270/321* (2013.01); *F05B 2270/324* (2013.01); *F05B 2270/327* (2013.01); *F05B 2270/328* (2013.01); *F05B 2270/329* (2013.01); *F05B 2270/335* (2013.01); *F05B 2270/709* (2013.01)

(56) References Cited

U.S. PATENT DOCUMENTS

| | | | | |
|---|---|---|---|---|
| 7,952,215 | B2* | 5/2011 | Hayashi | H02P 9/00 290/55 |
| 9,982,656 | B2* | 5/2018 | Li | G01B 21/22 |
| 2007/0125165 | A1 | 6/2007 | Ormel et al. | |
| 2012/0078518 | A1 | 3/2012 | Krishna | |
| 2013/0134711 | A1 | 5/2013 | Spruce | |
| 2017/0285066 | A1* | 10/2017 | Esbensen | F03D 7/00 |
| 2018/0030955 | A1 | 2/2018 | Vaddi et al. | |
| 2018/0016369 | A1 | 6/2018 | Danielsen et al. | |
| 2019/0063406 | A1 | 2/2019 | Nielsen et al. | |
| 2019/0323482 | A1* | 10/2019 | Mittelmeier | F03D 7/0204 |

FOREIGN PATENT DOCUMENTS

| | | |
|---|---|---|
| EP | 2015082 A2 | 1/2009 |
| EP | 2080901 A2 | 7/2009 |
| EP | 2213873 A1 | 8/2010 |
| EP | 2679813 A1 | 1/2014 |
| EP | 2715122 A2 | 4/2014 |
| WO | 2012163362 A2 | 12/2012 |

OTHER PUBLICATIONS

European Search Report and Written Opinion of the European Searching Authority dated Jun. 18, 2019 for Application No. 18212393. 5.

* cited by examiner

CORRECTING MEASURED WIND CHARACTERISTIC OF A WIND TURBINE

CROSS-REFERENCE TO RELATED APPLICATIONS

This application claims priority to PCT Application No. PCT/EP2019/079798, having a filing date of Oct. 31, 2019, which is based off of EP Application No. 18212393.5, having a filing date of Dec. 13, 2018, the entire contents both of which are hereby incorporated by reference.

FIELD OF TECHNOLOGY

The following relates to a method and an arrangement of correcting a measurement value of at least one wind characteristic, in particular wind speed and/or wind direction, related to a wind turbine having a rotor with plural rotor blades at least one having an adaptable flow regulating device installed.

BACKGROUND

Conventionally, wind direction and wind speed measurements may typically be performed by sensors located at the nacelle of the wind turbine. The wind direction and wind speed measurements may for example be used for control purpose, such as aligning the turbine up into the wind (by yawing it appropriately) and monitoring the yaw error (to ensure loading from yaw misalignment is limited) and stopping the turbine in case of too high wind speed.

Since wind speed and direction sensors may typically be located downstream (in the direction of the wind behind) the rotor, the readings from these sensors may be affected by the flow of the rotor, whereas the control system prefers to act on the free wind values, i.e. the value of the wind characteristic upstream the plane spanned by the rotor blades. Additionally, the flow may be impact by a nacelle component, for example when wind sensors are located close to a cooling tower. The resulting impact on the sensor may then come from a combination of impact on flow by rotor and impact on flow by a nacelle component.

Conventionally, correction methods may have been applied to correct for the measurement errors. However, it has been observed, that the corrected measurement values not in all circumstances correspond to the true wind characteristic.

Thus, an aspect relates to a method and an arrangement of correcting a measurement value of at least one wind characteristic related to a wind turbine having a rotor with plural rotor blades at least one having an adaptable flow regulating device installed, wherein an accuracy of the corrected measurement values is improved compared to the state of the art.

SUMMARY

According to an embodiment of the present invention it is provided a method of correcting a measurement value of least one wind characteristic, in particular wind speed and/or wind direction, related to a wind turbine having a rotor with plural rotor blades at least one having an adaptable flow regulating device installed, the method comprising: measuring a value of the wind characteristic; obtaining state information of the adaptable flow regulating device; and determining a corrected value of the wind characteristic based on the measured value of the wind characteristic and the state information of the adaptable flow regulating device.

The method may for example be implemented in software and/or hardware and may be performed for example by a wind turbine controller or a wind park controller. The wind characteristic may be capable of characterizing the wind, in particular regarding the wind speed and/or the wind direction.

At least one rotor blade (or all rotor blades of the wind turbine) has an adaptable flow regulating device installed. The adaptable flow regulating device is capable to adapt or modify the air flow around or close to the rotor blade depending on its state which comprises at least two states, at least one on-state and one off-state. Adapting the flow regulating device may involve setting the regulating device into the on-state or setting the flow regulating device into the off-state (or in an intermediate state).

The determined corrected value of the wind characteristic may relate to the value of the wind characteristic upstream an area or plane covered by the rotor blades, i.e., a value which is unaffected by the wind turbine operation. Thus, the corrected value of the wind characteristic may relate to the value of the wind characteristic the rotor and/or the rotor blades are subjected to. A wind speed sensor installed for example at the nacelle of the wind turbine may not be capable of accurately measuring or determining the value of the wind characteristic upstream of the rotor blades, since the rotating rotor blades may influence the air flow such that the value of the wind characteristic downstream the plane of the rotor blades may be different from the value of the wind characteristic upstream the plane of the rotor blades.

The adaptable flow regulating device may be different from the conventional mechanism of adjusting the blade pitch angle of the blades. The adaptable flow regulating device may be a device in addition to the blade pitch mechanism and the adaptable flow regulating device may, depending on its state, affect the flow characteristics of the air around or close to the surfaces of the rotor blades. The adaptable flow regulating device may be adaptable in the sense that the device may be in one of plural different states, each state having a corresponding air flow characteristics or air flow influencing property. The flow regulating device may comprise one or more portions (for example installed along the longitudinal direction of the rotor blade). The flow regulating device may for example be installed at any position of an outside surface of the blade, for example at a suction side, a pressure side, at a leading edge or at a trailing edge or a combination thereof. For adapting the flow regulating device, for example a protrusion height of a portion of the regulating device may for example be changed, the protruding height representing the height by which the outside surface of the flow regulating device protrudes from surrounding surface portions of the rotor blade. Alternatively or additionally, the adaptation may involve changing a tilt angle by which an active surface portion of the flow regulating device is tilted relative to other portions of the rotor blade. Also, a combination of changing a protrusion height and changing a tilt angle is possible for adapting the flow regulating device.

The state information of the adaptable flow regulating device may comprise any information regarding the (structural) positional and/or orientational state of the adaptable flow regulating device. The state information may for example comprise information regarding the activation level of the adaptable flow regulating device. The state information of the adaptable flow regulating device may also comprise individual state information of each portion of the adaptable flow regulating device, such as portions installed along the rotor blade in the longitudinal direction.

The state of the flow regulating device may relate to the structural state of the flow regulating device, for example a tilt angle and/or a protrusion height and/or a degree of filling of an inflatable bag or hose which is used to achieve different adaptations of the flow regulating device, for example regarding protrusion height and/or tilt angle. The adaptable flow regulating device may for example comprise a blade add-on, i.e., a device in addition to the mere rotor blade.

The determined corrected value of the wind characteristic may to a higher accuracy than the measured value of the wind characteristic corresponding to the true value of the wind characteristic upstream the plane spanned by the rotor blades. Since the state of the adaptable flow regulating device influences the wind characteristics downstream the rotor blade plane, taking into account the state of the adaptable flow regulating device may enable to more accurately determine the true value of the wind characteristic. In particular, it is expected that the adaptable flow regulating device may, depending on its state, impact the air flow and result in different flows at the same wind speed. Thus, even if the adaptable flow regulating device is set into an active state (influencing the air flow close to or around the rotor blade), a relatively reliable and accurate corrected value of the wind characteristic reflecting the true value of the wind characteristic may be obtained by taking into account the state information of the adaptable flow regulating device.

The corrected value of the wind characteristic may also be considered to be or comprise a calibrated value of the wind characteristic such that the methods of correcting may also be considered to represent a calibration method.

The measured value of the wind characteristic may for example be obtained using a wind speed sensor and/or wind direction sensor, for example installed at the wind turbine, in particular, installed at a nacelle of the wind turbine.

According to an embodiment of the present invention, the method further comprises obtaining further values for at least one of: power output of the wind turbine, rotor speed of the rotor, pitch angle of the rotor blades, yaw misalignment angle, air temperature, air pressure; wherein the determining the corrected value of the wind characteristic is further based on at least one of the obtained further values, in particular at least the values for power output of the wind turbine, rotor speed of the rotor and pitch angle of the rotor blades. Yawing angle (absolute orientation of nacelle) may not be of interest, but the degree of misalignment (yaw misalignment angle) may be required to be taken into account.

The value of the power output may for example be obtained from measurements of current and/or voltage at an output terminal of the wind turbine, for example an output terminal of a converter of the wind turbine which is connected to the generator of the wind turbine. The rotor speed of the rotor may for example be measured using an encoder or measured using electrical quantities. The pitch angle of the rotor blades may be obtained from a pitch angle adjustment mechanism, for example using a pitch angle setting or using a measured pitch angle.

Taking into account all the further values or at least one of the further values listed above, may improve the accuracy of the corrected value of the wind characteristic. Since the state of the adaptable flow regulating device may affect the operational characteristics of the wind turbine, in particular, may affect the power output and/or rotor speed, taking into account the state information of the adaptable flow regulating device for determining the corrected value of the wind characteristic may improve the accuracy of the corrected value of the wind characteristic.

According to an embodiment of the present invention, determining the corrected value of the wind characteristic includes: determining a correction value of the wind characteristic based on the state information of the adaptable flow regulating device; and adding the correction value and the measured value of the wind characteristic to obtain the corrected value of the wind characteristic.

The correction value of the wind characteristic may be considered as an offset value which has to be added to the measured value to obtain the corrected value of the wind characteristic. Thereby, the method may be simplified.

According to an embodiment of the present invention, the correction value, in particular listed as a function of an estimated value of the wind speed, of the wind characteristic is obtained using a look up table and/or neural network and/or a correction function, which is based on measurements and/or determinations and/or estimations, at different states of the adaptable flow regulating device, of the wind characteristic and at least one of the further values.

Thus, the correction value may depend on at least an estimated value of the wind speed. The estimated value of the wind speed may in turn be determined based on a measured wind speed and taking into account at least the state of the adaptable flow regulating device. In particular, the estimated value of the wind may be obtained by estimating the wind speed based on power output of the wind turbine, rotor speed of the rotor, pitch angle of the rotor blade and the state information of the adaptable flow regulating device. The correction value may for example be a function of the estimated value of the wind speed, power output, rotor speed and/or pitch angle of the rotor blades. The correction value may have previously been obtained or derived using measurements and/or determinations and/or estimation, for example based on simulations of the air flow around the rotor blade and other operational properties of the wind turbine. Thereby, accurate correction values may be obtained for the different parameters.

According to an embodiment of the present invention, the wind characteristic includes wind speed, wherein a value of estimated wind speed estimated based on the state information is used as a reliable value when setting up the correction function.

Taking into account the state information of the adaptable flow regulating device may enable to estimate an accurate value of the wind speed, in particular when further the power output of the wind turbine, the rotor speed of the rotor and the pitch angle of the rotor blades are taken into account. Thereby, setting up the correction function may be simplified. The correction function may for example be implemented as a mathematical function, a look-up table or a neural network. Thereby, utilization of a wind speed sensor may be dispensed with. Thereby, the method may be simplified.

According to an embodiment of the present invention, the measured value of the wind speed is obtained from a wind speed sensor installed at the wind turbine. Conventionally, a wind speed sensor may be installed at a nacelle. Thereby, the method may support conventional wind turbines.

According to an embodiment of the present invention, the value of the estimated wind speed is based on the values for power output, rotor speed, pitch angle and the state information of the adaptable flow regulating device. Conventionally, only power output, rotor speed and pitch angle of the rotor blade may have been taken into account to estimate a value of the wind speed. Since the adaptable flow regulating device may affect the wind characteristic downstream the rotor plane depending on its state, taking into account the state information of the adaptable flow regulating device may improve the accuracy of the estimation of the value of the wind speed.

According to an embodiment of the present invention, the wind characteristic includes wind direction, wherein a value of wind direction measured using a wind direction sensor at a neighbouring mast is used as a reliable value when setting up the correction function.

The wind direction as determined by a wind direction sensor at a neighbouring mast may be a reliable wind direction measurement value. Thereby, setting up the correction function may be improved.

According to an embodiment of the present invention, the wind characteristic includes wind direction, wherein a derived value of the wind direction, as derived by performing a hill climbing algorithm in which the nacelle orientation is changed until most power output is obtained, is used as a reliable value when setting up the correction function.

When the wind turbine nacelle is yawed such as that the rotation axis is parallel to the true wind direction upstream the rotor blade, it is expected that power output is maximal. Thereby, it is not needed to provide for an additional wind direction sensor, for example installed at a mast.

According to an embodiment of the present invention, the measured value of the wind direction is obtained from at least one of: a wind direction sensor installed at the wind turbine; a nacelle orientation. Thereby, the measured value of the wind direction is obtained in a simple manner using equipment included in conventional wind turbines.

According to an embodiment of the present invention, the adaptable flow regulating device or at least one portion of several adaptable flow regulating portions is adjustable to be in at least two states, in particular in more than two states, representing different activation levels, the state information being indicative of the respective activation level.

At least an on-state and an off-state may be comprised in the different activation levels. When the adaptable flow regulating device comprises several portions, they may independently be set to individual activation states which may be different. Thereby, conventionally available flow regulating devices may be supported.

According to an embodiment of the present invention, the adaptable flow regulating device comprises several adaptable flow regulating portions installed along the rotor blade, wherein the state information of the adaptable flow regulating device comprises state information of at least one, in particular all, portion(s) of the several adaptable flow regulating portions.

All portions of the adaptable flow regulating device may influence or affect the air flow around or close to the wind turbine and may therefore be necessary to be taken into account for deriving the corrected value of the wind characteristic in an accurate manner.

According to an embodiment of the present invention, the adaptable flow regulating device comprises: at least one adaptable spoiler installed at at least one of the rotor blades, in particular at a leading edge of a suction surface; and/or at least one adaptable flap installed at at least one of the rotor blades, in particular at a trailing edge of a suction surface. Thereby, conventionally available adaptable flow regulating devices are supported.

According to an embodiment it is provided a method of controlling a wind turbine, the method comprising: performing a method of correcting a measurement value of least one wind characteristic; and controlling the wind turbine based on the corrected measurement value of the wind characteristic.

It should be understood that features, individually or in any combination, disclosed, described, explained or provided for a method of correcting a measurement value of at least one wind characteristic related to a wind turbine having a rotor with plural rotor blades at least one having an adaptable flow regulating device installed, may also be, individually or in any combination, applied for or provided for an arrangement for correcting a measurement value of at least one wind characteristic related to a wind turbine, according to embodiments of the present invention and vice versa.

According to an embodiment of the present invention it is provided an arrangement for correcting a measurement value of least one wind characteristic, in particular wind speed and/or wind direction, related to a wind turbine having a rotor with plural rotor blades at least one having an adaptable flow regulating device installed, the arrangement comprising: a sensor adapted to measure a value of the wind characteristic; an input module adapted to obtain state information of the adaptable flow regulating device; and a processor adapted to determine a corrected value of the wind characteristic based on the measured value of the wind characteristic and the state information of the adaptable flow regulating device.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Figure 2:
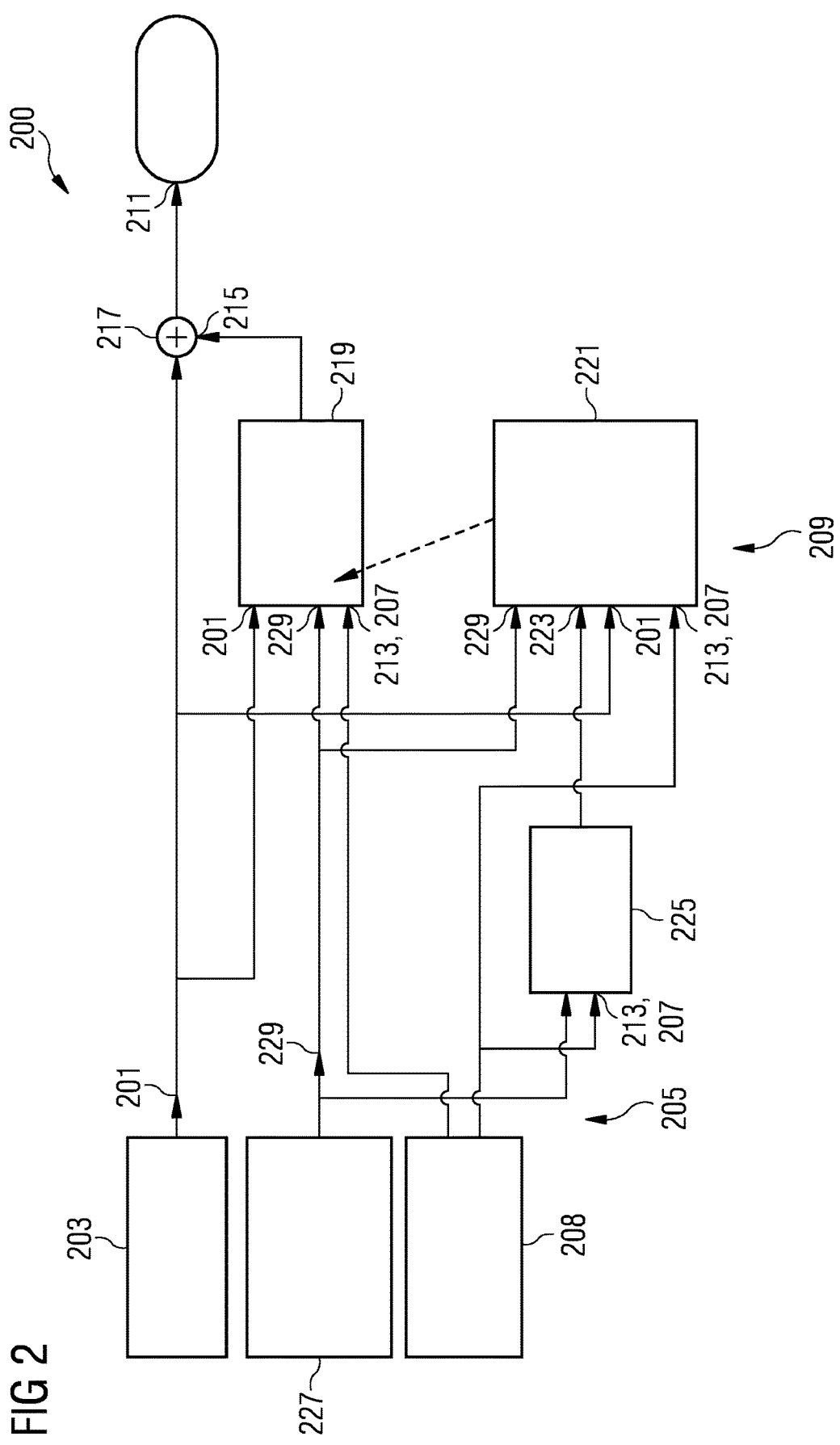
Figure 3:
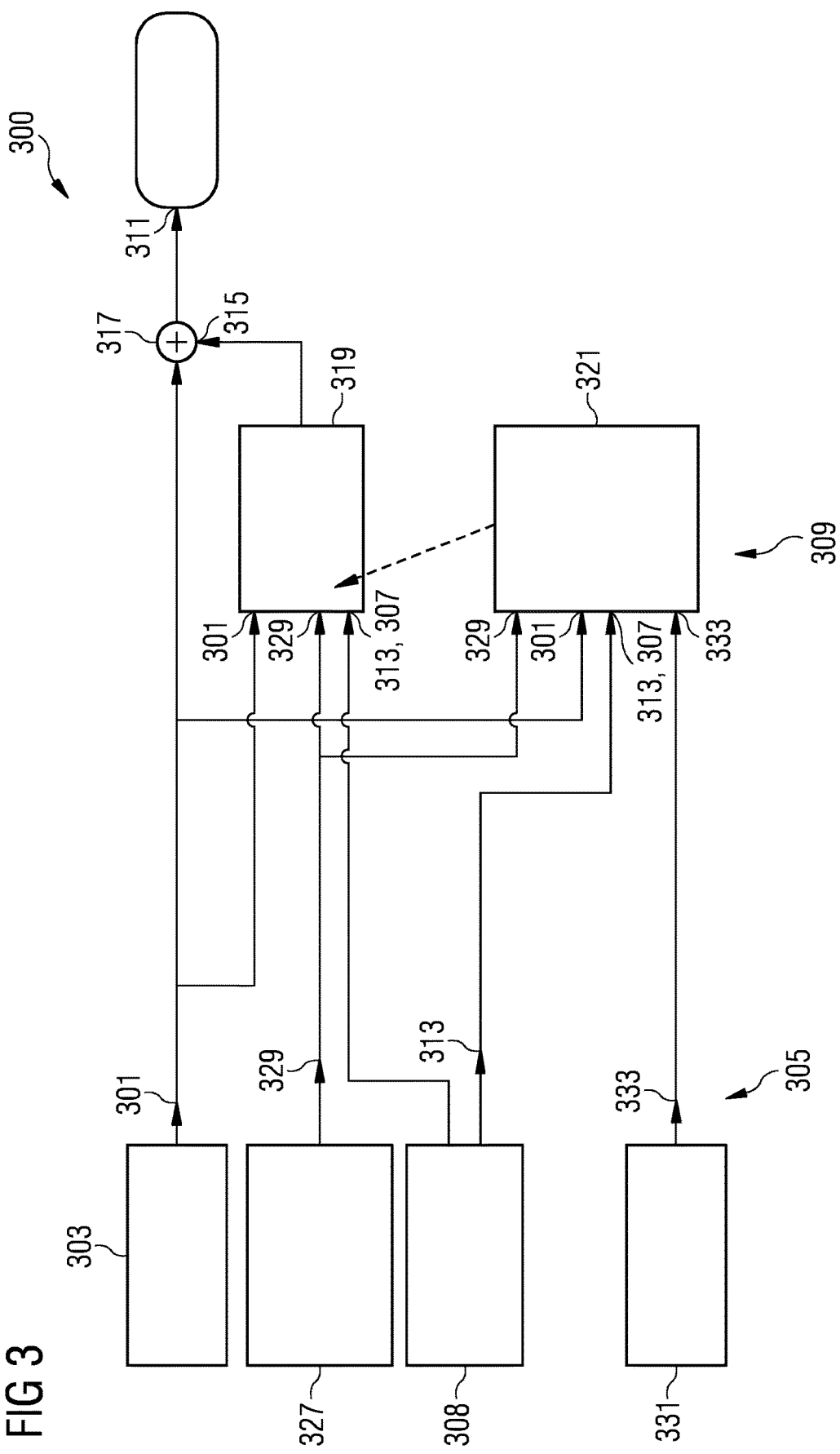
Figure 4:
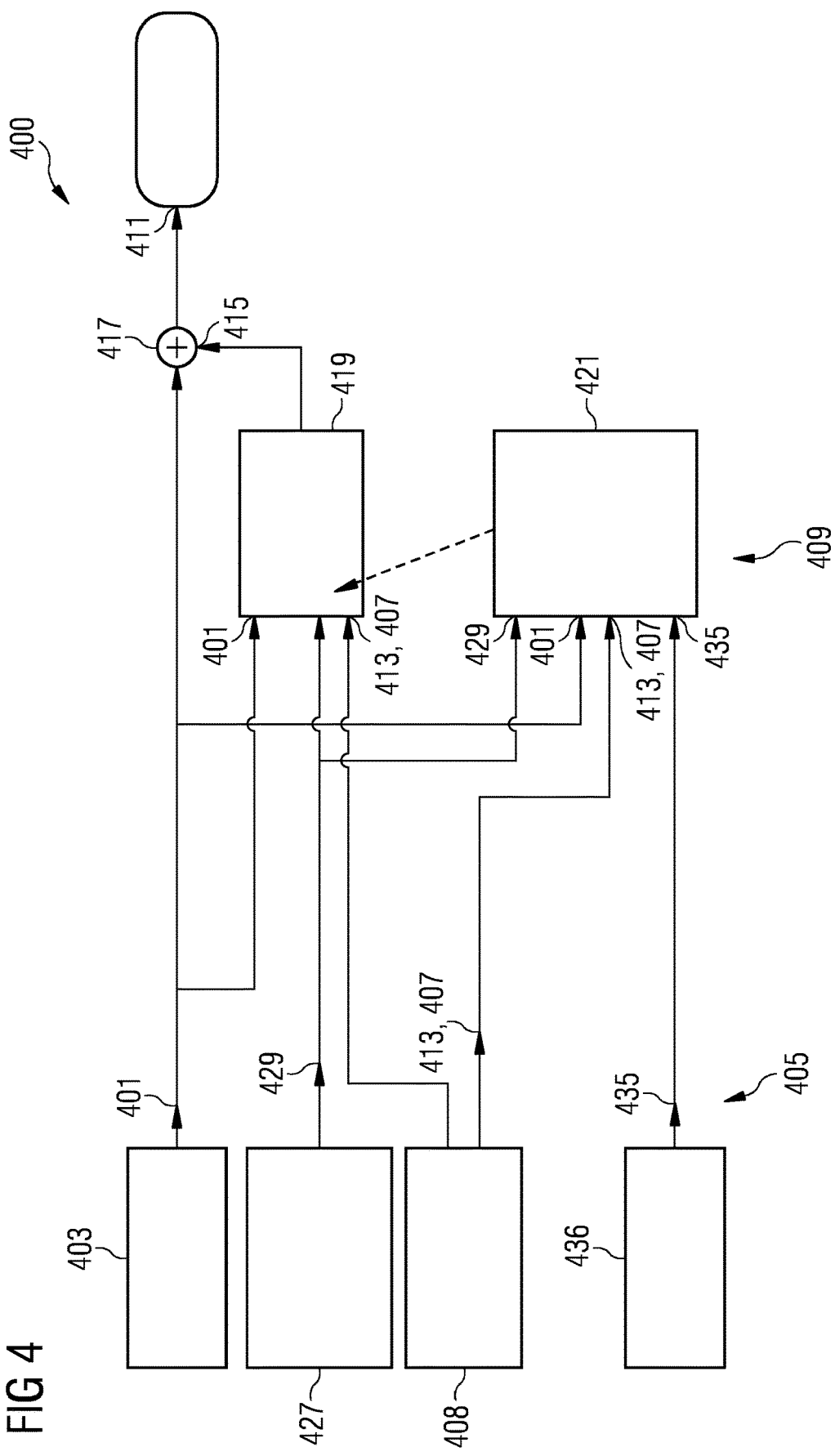
Figure 5:
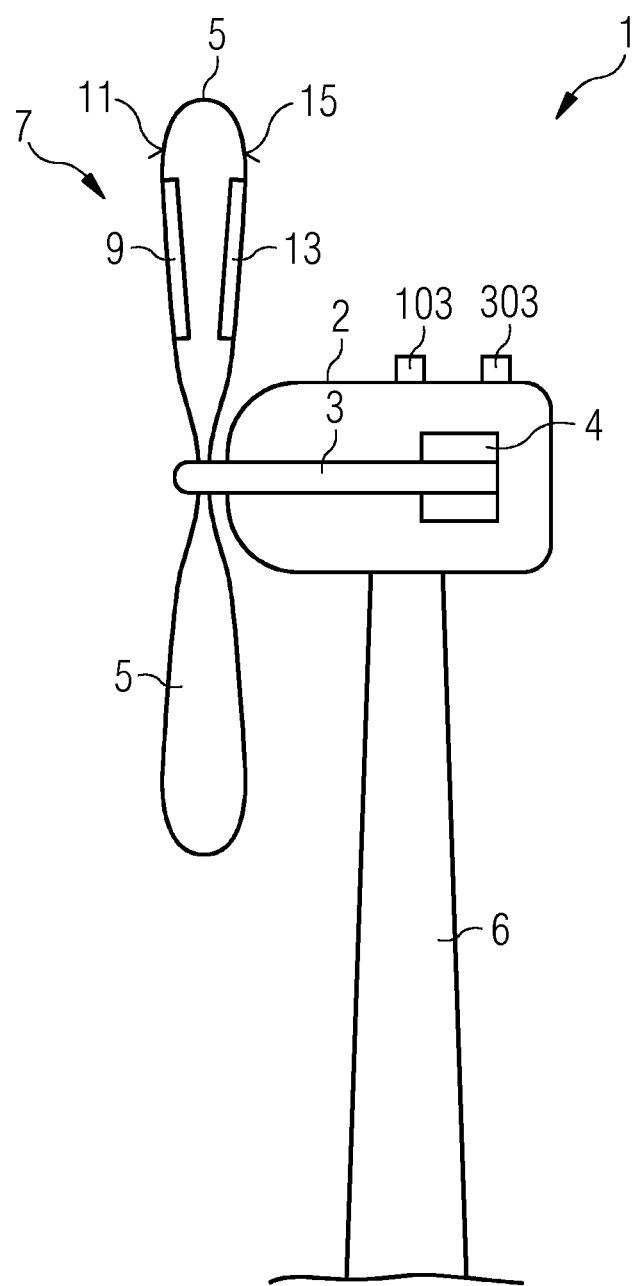

Some of the embodiments will be described in detail, with reference to the following figures, wherein like designations denote like members, wherein:

FIG. 1 schematically illustrates an arrangement for correcting a measurement value of the wind characteristic wind speed related to a wind turbine according to an embodiment of the present invention which is configured to perform a method of correcting a measurement value of wind speed related to a wind turbine according to an embodiment of the present invention;

FIG. 2 schematically illustrates an arrangement for correcting a measurement value of the wind characteristic wind speed related to a wind turbine according to another embodiment of the present invention which is configured to perform a method of correcting a measurement value of wind speed related to a wind turbine according to another embodiment of the present invention;

FIG. 3 schematically illustrates an arrangement for correcting a measurement value of the wind characteristic wind direction related to a wind turbine according to an embodiment of the present invention which is configured to perform a method of correcting a measurement value of wind direction related to a wind turbine according to an embodiment of the present invention;

FIG. 4 schematically illustrates an arrangement for correcting a measurement value of the wind characteristic wind direction related to a wind turbine according to another embodiment of the present invention which is configured to perform a method of correcting a measurement value of wind direction related to a wind turbine according to another embodiment of the present invention; and FIG. 5 schematically illustrates a wind turbine to which embodiments of the present invention apply.

DETAILED DESCRIPTION

Elements or modules similar in structure and/or function in FIGS. 1 to 4 are labelled with reference signs differing only in the first digit. A description of an element not in particular described with reference to a particular embodiment may be taken from the respective description of this element in the context of another embodiment. Blocks or modules in FIGS. 1 to 4 may represent hardware and/or software or function modules.

The arrangement 100 is for correcting a measurement value 101 of at least one wind characteristic (here wind speed) related to a wind turbine 1 (see FIG. 5) having a nacelle 2 (on top of tower 6) harbouring a rotor 3 (driving generator 4) with plural rotor blades 5 at least one having an adaptable flow regulating device 7 installed. The arrangement comprises a wind speed sensor 103 adapted to measure a value 101 of the wind characteristic, here the wind speed. The arrangement 100 further comprises an input module 105 adapted to obtain state information 107 of the adaptable flow regulating device 7.

In the embodiment of the wind turbine 1 illustrated in FIG. 5 the rotor has rotor blades 5 having installed an adaptable flow regulating device 7 which comprises a spoiler 9 which is installed at a leading edge 11 at a suction side of the rotor blade 5 and a flap 13 which is installed at a rear edge 15 at the suction side of the rotor blade 5.

The arrangement 100 illustrated in FIG. 1 further comprises a processor 109 which is adapted to determine a corrected value 111 of the wind speed based on the measured value 101 of the wind speed and the state information 107 of the adaptable flow regulating device 7. Thereby, the processor 109 obtains further values 113 of at least the power output of the wind turbine, the rotor speed of the rotor and the pitch angle of the rotor blades. The corrected value 111 is thereby determined further based on at least the values 113 for power output of the wind turbine, rotor speed of the rotor and pitch angle of the rotor blades.

Furthermore, determining the corrected value 111 of the wind speed (in general the wind characteristic) includes determining a correction value 115 of the wind speed based on the state information 107 of the adaptable flow regulating device 7 and an estimated wind speed 123. In the embodiment 100 illustrated in FIG. 1, the value 123 of the estimated wind speed is determined by an estimation module 125 based on the state information 107 of the adaptable flow regulating device 7 and the values 113 for pitch angle, rotor speed and power output.

Furthermore, using an addition element 117 the correction value 115 is added to the measured value 101 of the wind speed to obtain the corrected value 111 of the wind speed. In the embodiment illustrated in FIG. 1, the correction value 105 of the wind speed is obtained from a two-dimensional look-up table 119 which has been set up using a calibration function 121. The calibration function 121 may be based on measurements at different states of the adaptable flow regulating device 7, i.e., determinations of the wind speed and at least one of the further values 113.

For setting up the calibration function 121 and/or the look-up table 119, the estimated wind speed 123 as estimated by the estimation module 125 is utilized as a reliable and accurate value of the wind speed upstream of the plane of the rotor blades. Therein, the calibration function receives as inputs the measured value 101 of the wind speed, the estimated wind speed 123 as well as the state information 107 of the adaptable flow regulating device. The look-up table 119 receives the state information 107 as well as the estimated wind speed 123 for looking up the correction value 115.

According to the embodiment illustrated in FIG. 1, a new dimension for wind speed calibration or wind speed correction is introduced which is related to the activation level of the flow regulating device which may in particular be capable of achieving an air stall close to the rotor blade. The estimated wind speed 123 (the available wind speed) is, together with the activation level of the flow regulating device, used as a source of the look-up table 119 to look up the correction value 115. The look-up table may be a two-dimensional look-up table which receives as inputs two quantities, namely the estimated wind speed 123 and the state information 107. The calibration function 121 may compare the estimated wind speed 123 with the measured wind speed 101 in different operational stages of the wind turbine and may provide values to the look-up table 119 regarding wind speed offset compensation, i.e., the correction value 115.

In the module 112 the pitch angle, the rotor speed and the power output of the wind turbine are determined, for example based on measurements. In another module 108, the state information of the adaptable flow regulating device 7 is determined or received.

FIG. 2 schematically illustrates an arrangement 200 for correcting a measurement value 201 of the wind speed, as measured by a wind speed sensor 203 according to another embodiment of the present invention. In the module 208 of the arrangement 200 illustrated in FIG. 2, the values 213 of the pitch angle, the rotor speed and the power output of the wind turbine are determined as well as the state information 207 of the adaptable flow regulating device 7 is obtained or determined. Furthermore, the values 213 of rotor speed, pitch angle and power output as well as the state information 207 of the adaptable flow regulating device are provided to the look-up table 219 as well as to the calibration function 221.

However, additionally to the embodiment illustrated in FIG. 1, the arrangement 200 further comprises a determination module or reception module 227 which may receive or determine other sensor data, such as rotor speed, temperature of the air, air pressure and so forth which are collectively labelled with reference sign 229. Also, these values of other sensor data 229 are provided as input to the look-up table 219 as well as to the calibration function 221. Further, as in the embodiment 100 illustrated in FIG. 1, the look-up table 219 as well as the calibration function 221 receive as input the measured value 201 of the wind speed.

Herein, the look-up table 219 has dimension higher than dimension 2, such as dimension 3, dimension 4, dimension 5 or even a higher dimension, depending on how many other sensor data 229 are received or taken into account. In general, a number of actuator settings may be taken into account which may increase the number of dimensions in the look-up table 219. In an embodiment, the multi-dimensional look-up table may then be exchanged with a neural network to avoid extreme large tables.

Thereby, the correction value 215 output by the look-up table 219 takes into account settings of a number of actuators or measurements of other sensors. The correction value 215 added to the measured value 201 of the wind speed results in the corrected value 211 of the wind speed.

FIG. 3 schematically an arrangement 300 for correcting a measurement value of a wind direction related to a wind turbine according to an embodiment of the present invention. Different from the embodiments 100 and 200 illustrated in FIGS. 1 and 2, the arrangement 300 illustrated in FIG. 3 comprises a wind direction sensor 303 which provides a measured value 301 of a wind direction. Furthermore, the arrangement 300 comprises a reference wind direction sensor 331 which is installed at a mast (located near the wind turbine e.g., but unaffected by wind turbine operation) which provides a mast measured value 333 of the wind direction. The mast measured value 333 is used as a reliable value of the wind direction by the calibration function 321. The mast at which the wind direction sensor 331 is installed may be located in the free wind near the wind turbine. In contrast, the wind direction sensor 303 may be arranged for example at the wind turbine, for example on a nacelle.

The arrangement 300 comprises modules 327 and 308 similar to the modules 227, 208 described with reference to FIG. 2. The calibration function 321 receives the other sensor data 329, the measured value 301 of the wind speed, the values 313 for power output, pitch angle and rotor speed, the state information 307 and further the mast measured wind direction 333. The high dimension look-up table 319 receives as input the measured value 301 of the wind direction, the other sensor data 329 as well as the values for power output, rotational speed, pitch angle 313 and further the state information 307 of the flow regulating device.

FIG. 4 schematically illustrates an arrangement 400 for correcting a measurement value of a wind direction related to a wind turbine according to another embodiment of the present invention. The arrangement 400 is similar to the arrangement 300 illustrated in FIG. 3. However, instead of using the value 333 as measured by the wind direction sensor 331 installed at a mast, the arrangement 400 is configured to perform a hill climbing algorithm 421 which receives an active power output 435 (from determination module 436) in dependence of a yawing angle for determining a reliable value of the wind direction. Thereby, the hill climbing algorithm finds the wind direction offset as a function of the different sensors and actuators with a hill climbing algorithm which searches for the most optimal power production.

Instead of using a high dimension look-up table 319 or 419 in the arrangement 300 and 400 illustrated in FIGS. 3 and 4, also a two-dimensional look-up table may be utilized as has been described with reference to FIG. 1. For example, from the power output, the pitch angle and the rotational speed as well as the state information, an estimated wind speed may be calculated as is utilized in FIG. 1 and may serve as input to a two-dimensional look-up table which may further receive the state information of the flow regulating device.

In general, embodiments of the present invention address the utilization of active flaps and trim stall segments (like spoilers, flaps). These flow regulating devices will impact the transfer function from measured wind direction to free wind direction. Embodiments of the present invention realize this dependency and propose solutions to take this impact of the state of the flow regulating device into consideration in order to ensure that the wind direction has properly transformed by an improved transfer function into a valid wind direction signal that has multiple controller applications. Most importantly, a reliable wind direction determination may be necessary to correctly align the turbine into the wind.

Utilization of active flaps and trim stall segments will also impact the transfer function from measured wind speed to free wind speed. Embodiments realize this dependency and propose solutions to take this impact into consideration in order to ensure that the wind speed is properly transformed by an improved transfer function into a valid wind speed signal that has multiple controller applications.

Embodiments may also support other active add-ons on the blades as well but could also be extended to other kinds of actuators.

If the wind speed sensor output is not affected by the change of the actuator setting, then they are properly compensated or calibrated as a function of these actuators The air flow (wind) at the sensor location may not be affected by the active blade addon (possible because addons are located closer to the tip of the blade than to the root where the sensor is positioned). However, still other quantities may be affected by the activation of the addon (for example the pitch position may for similar wind speed have another different value dependent on the activation and/or position and/or orientation of the addon). Hence the activation of the addon may indirectly impact the calibration, and the activation level or state of the addon may therefore be used as input to a function performing the wind characteristic calibration/correction. A parameter table with values for a calibration/compensation/correction as a function of activation level of active add-on may be utilized according to embodiments of the present invention.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of correcting a measurement value of least one wind characteristic, related to a wind turbine having a rotor with plural rotor blades, at least one having an adaptable flow regulating device installed, the method comprising:
   measuring a value of the wind characteristic;
   obtaining state information of the adaptable flow regulating device; and
   determining a corrected value of the wind characteristic based on the measured value of the wind characteristic and the state information of the adaptable flow regulating device;
   wherein the wind characteristic includes wind direction, and
   wherein a value of wind direction is used as a reliable value when setting up a correction function, or wherein a derived value of the wind direction, as derived by performing a hill climbing algorithm in which a nacelle orientation is changed until most power output is obtained, is used as a reliable value when setting up a correction function.

2. The method according to claim 1, further comprising:
   obtaining further values for at least one of:
      power output of the wind turbine,
      rotor speed of the rotor or generator,
      pitch angle of the rotor blades,
      yaw misalignment angle,
      air temperature, and
      air pressure;
   wherein the determining the corrected value of the wind characteristic is further based on at least one of the obtained further values.

3. The method according to claim 1, wherein determining the corrected value of the wind characteristic includes:
determining the correction value of the wind characteristic based on the state information of the adaptable flow regulating device; and
adding the correction value and the measured value of the wind characteristic to obtain the corrected value of the wind characteristic.

4. The method according to claim 3, wherein the correction value is obtained using a look up table and/or neural network and/or a correction function,
which is based on measurements and/or determinations and/or estimations, at different states of the adaptable flow regulating device, of the wind characteristic and at least one of the further values.

5. The method according to claim 4, wherein the wind characteristic includes wind speed, wherein a value of estimated wind speed estimated based on the state information is used as a reliable value when setting up the correction function.

6. The method according to claim 5, wherein the measured value of the wind speed is obtained from a wind speed sensor installed at the wind turbine.

7. The method according to claim 5, wherein the value of estimated wind speed is based on the values for power output, rotor speed, pitch angle and the state information of the adaptable flow regulating device.

8. The method according to claim 1, wherein the adaptable flow regulating device is different from a mechanism of adjusting the blade pitch angle of the blade.

9. The method according to claim 1, wherein the state information comprises information regarding the structural positional and/or orientational state of the adaptable flow regulating device.

10. The method according to claim 1, wherein the measured value of the wind direction is obtained from at least one of:
a wind direction sensor installed at the wind turbine;
a nacelle orientation.

11. The method according to claim 1, wherein the adaptable flow regulating device or at least one portion of several adaptable flow regulating portions is adjustable to be in at least two states, representing different activation levels, the state information being indicative of the respective activation level.

12. The method according to claim 1, wherein the adaptable flow regulating device comprises several adaptable flow regulating portions installed along the rotor blade, wherein the state information of the adaptable flow regulating device comprises state information of at least one portion of the several adaptable flow regulating portions.

13. The method according to claim 1, wherein the adaptable flow regulating device comprises:
at least one adaptable spoiler; and/or
at least one adaptable flap.

14. A method of controlling a wind turbine, the method comprising:
correcting a measurement value of at least one wind characteristic by measuring the measurement value of the at least one wind characteristic, obtaining state information of an adaptable flow regulating device of the wind turbine, and determining a corrected value of the at least one wind characteristic based on the measured value of the wind characteristic and the state information of the adaptable flow regulating device; and
controlling the wind turbine based on the corrected measurement value of the wind characteristic,
wherein the wind characteristic includes wind direction, and
wherein a value of wind direction is used as a reliable value when setting up a correction function, or wherein a derived value of the wind direction, as derived by performing a hill climbing algorithm in which a nacelle orientation is changed until most power output is obtained, is used as a reliable value when setting up the correction function.

15. The method according to claim 14, wherein the adaptable flow regulating device is different from the mechanism of adjusting the blade pitch angle of the blade.

16. The method according to claim 14, wherein the state information comprises information regarding the structural positional and/or orientational state of the adaptable flow regulating device.

17. An arrangement for correcting a measurement value of least one wind characteristic, related to a wind turbine having a rotor with plural rotor blades, at least one having an adaptable flow regulating device installed, the arrangement comprising:
a sensor adapted to measure a value of the wind characteristic;
an input module adapted to obtain state information of the adaptable flow regulating device; and
a processor adapted to determine a corrected value of the wind characteristic based on the measured value of the wind characteristic and the state information of the adaptable flow regulating device;
wherein the wind characteristic includes wind direction, and
wherein a value of wind direction measured is used as a reliable value when setting up a correction function, or wherein a derived value of the wind direction, as derived by performing a hill climbing algorithm in which a nacelle orientation is changed until most power output is obtained, is used as a reliable value when setting up a correction function.

18. The arrangement according to claim 17, wherein the adaptable flow regulating device is different from a mechanism of adjusting the blade pitch angle of the blade.

19. The arrangement according to claim 17, wherein the state information comprises information regarding the structural positional and/or orientational state of the adaptable flow regulating device.

* * * * *